US012568332B2

(12) United States Patent
Sun et al.

(10) Patent No.: US 12,568,332 B2
(45) Date of Patent: Mar. 3, 2026

(54) IN-VEHICLE ADAPTIVE SOUND PLAYBACK METHOD, SOUND SYSTEM AND DOMAIN CONTROLLER

(71) Applicant: AAC Microtech (Changzhou) Co., Ltd., Changzhou (CN)

(72) Inventors: Shuyuan Sun, Changzhou (CN); Yiming Meng, Changzhou (CN); Xiang Huang, Changzhou (CN); Xin Zhang, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 149 days.

(21) Appl. No.: 18/733,608

(22) Filed: Jun. 4, 2024

(65) Prior Publication Data

US 2025/0324197 A1 Oct. 16, 2025

Related U.S. Application Data

(63) Continuation of application No. PCT/CN2024/087694, filed on Apr. 15, 2024.

(51) Int. Cl.

*H04R 3/12* (2006.01)
*H04R 1/40* (2006.01)
*H04R 29/00* (2006.01)

(52) U.S. Cl.

CPC ............... *H04R 3/12* (2013.01); *H04R 1/403* (2013.01); *H04R 29/002* (2013.01); *H04R 2201/401* (2013.01); *H04R 2499/13* (2013.01)

(58) Field of Classification Search

CPC ........ H04R 3/12; H04R 1/403; H04R 29/002; H04R 2201/401; H04R 2499/13;

(Continued)

(56) References Cited

U.S. PATENT DOCUMENTS 11,950,035 B2 * 4/2024 Lee ........................ H04R 7/045
2021/0049384 A1 * 2/2021 Morrow ................. G07C 5/008

(Continued)

FOREIGN PATENT DOCUMENTS

CN 117319883 A * 12/2023 ............... H04R 3/00
TW 201442521 A * 11/2014

*Primary Examiner* — Sean H Nguyen

(74) *Attorney, Agent, or Firm* — Wiersch Law Group

(57) ABSTRACT

The present application provides an in-vehicle adaptive sound playback method, a sound system, and a domain controller. The present application utilizes a domain controller to obtain environmental data indicative of the environment of the cockpit, analyze sound playback parameters corresponding to the environmental data, and then regulate the physical state of each speaker according to the physical state parameters, process the audio signals to be played back according to the sound effect parameters, and finally transmit the processed target audio signal to each speaker regulated, and the loudspeakers carry out sound playback of the target audio signal. It is understood that when the environment of the cockpit changes, the sound playback parameters will also change accordingly, i.e., the sound playback has strong adaptability to different cockpit environments, and the optimal sound playback effect can be obtained under different cockpit environments, thereby bringing a preferred acoustic experience for the user.

11 Claims, 14 Drawing Sheets

(58) Field of Classification Search
CPC .......... G10K 11/16; G10K 9/22; G10K 11/32; B60R 11/0223; B60R 2011/0028; B60R 2011/0033; B60R 2011/0021; B60R 2011/0022; B60R 2011/0063; B60R 2011/0026; B60R 2011/0029; B60R 2011/0035; B60R 2011/0012; B60R 2011/0036
USPC .......................................................... 381/59
See application file for complete search history.

(56) References Cited

U.S. PATENT DOCUMENTS

2021/0107496 A1* 4/2021 Oboril ............... B60W 60/0013
2021/0191394 A1* 6/2021 Dudley ................ G05D 1/0061

* cited by examiner

IN-VEHICLE ADAPTIVE SOUND PLAYBACK METHOD, SOUND SYSTEM AND DOMAIN CONTROLLER

CROSS-REFERENCE TO RELATED APPLICATIONS

The present application is a continuation of International Application No. PCT/CN2024/087694, filed Apr. 15, 2024, the entire contents of which are incorporated herein by reference.

TECHNICAL FIELD

The present application relates to the technical field of sound playback, in particular to an in-vehicle adaptive sound playback method, a sound system, and a domain controller.

BACKGROUND

The in-vehicle sound system is an essential component of in-vehicle entertainment, capable of sound reproduction within the vehicle cabin, thereby providing users with an excellent and immersive driving experience. Typically, the cabin environment is not static; it varies based on the acoustic characteristics within the vehicle (such as background noise, direct sound, and reflected sound) as well as the driving conditions (such as driving speed, number of passengers, seating position, the status of windows and doors). In other words, when the acoustic characteristics within the vehicle and/or the driving conditions change, the cabin environment also changes. Consequently, if the in-vehicle sound system only has a fixed sound reproduction mode, it cannot adapt to all cabin environments. This means that in various cabin environments, the sound system cannot achieve optimal sound reproduction, resulting in a poor acoustic experience for the passengers.

In related art, the in-vehicle sound system can be configured with several different sound reproduction modes, such as driver mode, full vehicle mode, and rear seat mode. Users can manually or via voice instructions select different sound reproduction modes to suit different cabin environments. However, this requires users to independently assess the cabin environment and choose the appropriate sound reproduction mode themselves, leading to cumbersome operations and reducing the overall intelligence of the vehicle. Furthermore, when switching sound reproduction modes, the changes are mostly limited to the sound system's software parameters, which do not adequately adapt to different cabin environments. That is, the adaptability to various cabin environments is poor, so it is necessary to improve the existing sound reproduction schemes within the vehicle.

SUMMARY

The present application provides an in-vehicle adaptive sound playback method, a sound system, and a domain controller, aiming to solve the problems of the cumbersome process of switching sound reproduction modes and poor adaptability to different cabin environments in the related art.

In order to solve the above technical problems in the related art, a first aspect of the present application provides an in-vehicle adaptive sound playback method applied to a sound system of a vehicle, the sound system comprising a domain controller communicatively connected to a bus of the vehicle, a loudspeaker module arranged in a cockpit of the vehicle and communicatively connected to the domain controller, and a sensor module provided in the cockpit and communicatively connected to the domain controller, wherein the loudspeaker module comprises a plurality of loudspeakers located at different positions in the cockpit, and the sensor module is configured to detecting ride data of the cockpit and acoustic characteristic data in the cockpit; the in-vehicle adaptive sound playback method is applied in the domain controller, and comprises:

- acquiring environmental data of the cockpit; wherein the environmental data comprises the acoustic characterization data, the ride data, and public data of the vehicle shared by the bus;
- analyzing sound playback parameters compatible with the environmental data; wherein the sound playback parameter comprises a sound effect parameter and a physical state parameter of each of the loudspeakers;
- regulating a physical state of each of the loudspeakers according to the physical state parameter; wherein the physical state comprises a power-on state and a power-off state;
- obtaining an audio signal to be played back and processing the audio signal based on the sound effect parameters to obtain a target audio signal; and
- transmitting the target audio signal to each of the loudspeakers in the power-on state for sound playback of the target audio signal in the cockpit.

A second aspect of the present application provides a sound system, which is applied in a vehicle, comprising a domain controller communicatively connected to a bus of the vehicle, a loudspeaker module arranged in a cockpit of the vehicle and communicatively connected to the domain controller, and a sensor module provided in the cockpit and communicatively connected to the domain controller, wherein the loudspeaker module comprises a plurality of loudspeakers located at different positions in the cockpit, and the sensor module is configured to detecting ride data of the cockpit and acoustic characteristic data in the cockpit; specifically, the domain controller is configured to:

- acquire environmental data of the cockpit; wherein the environmental data comprises the acoustic characterization data, the ride data and public data of the vehicle shared by the bus;
- analyze sound playback parameters compatible with the environmental data; wherein the sound playback parameter comprises a sound effect parameter and a physical state parameter of each of the loudspeakers;
- regulate a physical state of each of the loudspeakers according to the physical state parameter; wherein the physical state comprises a power-on state and a power-off state;
- obtain an audio signal to be played back and process the audio signal based on the sound effect parameters to obtain a target audio signal; and
- transmit the target audio signal to each of the loudspeakers in the power-on state for sound playback of the target audio signal in the cockpit.

A third aspect of the present application provides a domain controller comprising a memory and a processor communicatively connected to the memory, wherein the memory is configured to store a computer program, and the processor is configured to call the computer program for realizing the in-vehicle adaptive sound playback method referred to in the first aspect of the present application.

Through the implementation of the above technical solution of the present application, the domain controller is configured to obtain environmental data indicative of the environment of the cockpit, analyze sound playback parameters (i.e., sound effect parameters and physical state parameters of each loudspeaker) compatible with the environmental data, regulate the physical state of each loudspeaker according to the physical state parameters, and process the audio signals to be played back according to the sound effect parameters to obtain a target audio signal, and finally transmit the target audio signal to the audio signal that has been processed by the physical state parameters. Then the loudspeakers carry out sound playback of the target audio signal in the cockpit. It is to be understood that since the sound playback parameters used in the sound playback process are compatible with the environmental parameters of the cockpit, the sound playback carried out inside the cockpit is also compatible with the environment of the cockpit. Thus, when the environment of the cockpit changes, the sound playback parameters used in the sound playback process will also change accordingly, i.e., the sound playback in the present application has strong adaptability to different cockpit environments, so that optimal sound playback effects can be obtained in different cockpit environments, thereby bringing a preferred acoustic experience for the user. Besides, the change of the sound playback parameters is spontaneous when the environment of the cockpit is changed, and does not require the user to manually/voice-adjust the sound playback parameters, which not only ensures the degree of intelligentization of the whole vehicle, but also reduces the user's tediousness in the operation.

BRIEF DESCRIPTION OF DRAWINGS

In order to more clearly illustrate the technical solutions in the related art or the embodiments of the present application, the accompanying drawings to be used in the description of the related art or the embodiments of the present application will be briefly introduced as follows. Obviously, the accompanying drawings in the following description are only some embodiments of the present application rather than all embodiments, and a person of ordinary skill in the field may, under the premise of no creative labor, obtain other drawings according to these accompanying drawings.

DESCRIPTION OF EMBODIMENTS

In order to make the objects, technical solutions, and advantages of the present application more obvious and understandable, the present application will be described clearly and completely in the following in conjunction with the embodiments of the present application and the corresponding accompanying drawings, where the same or similar symbols from the beginning to the end denote the same or similar elements or elements having the same or similar functions. It should be understood that the various embodiments of the present application described below are used only to explain the present application, and are not used to limit the present application, i.e., based on the various embodiments of the present application, all other embodiments obtained by a person of ordinary skill in the art without making creative labor fall within the protection scope of the present application. In addition, the technical features involved in the various embodiments of the present application described below may be combined with each other as long as they do not constitute a conflict with each other.

In the related art, when the in-vehicle sound system switches the sound playback mode, the user is required to spontaneously judge the environment of the cockpit and independently select the sound playback mode, which not only brings cumbersome operation for the user, but also reduces the degree of intelligence of the entire vehicle. Besides, when switching the sound playback mode, most of the sound parameters are switched at the software level of the in-car audio system, which is not well compatible with different cabin environments, i.e., poor adaptability to different cabin environments. Therefore, the following embodiments of the present application proposes an in-vehicle adaptive sound playback method, and a sound system applying the in-vehicle adaptive sound playback method, in order to circumvent the above drawbacks existing in the related art.

Figure 1:
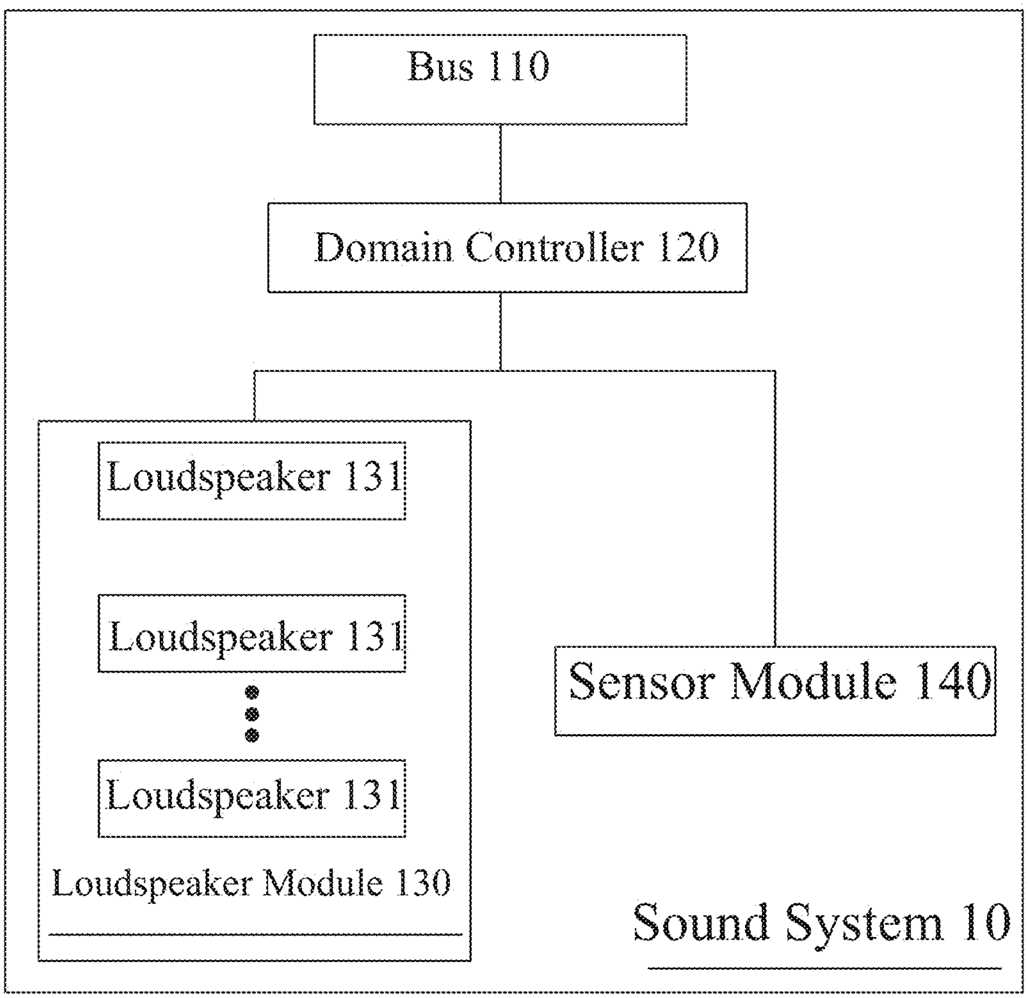
FIG. 1 shows a block diagram of a sound system provided by embodiments of the present application.

FIG. 1 is a block diagram of a sound system. In some embodiments, the sound system 100 is applied in a vehicle, including a domain controller 120 communicatively connected to a bus 110 of the vehicle, a loudspeaker module 130 disposed in a cockpit of the vehicle and communicatively connected to the domain controller 120, and a sensor module 140 disposed in the cockpit and communicatively connected to the domain controller 120, the loudspeaker module 130 the loudspeaker module 130 includes a plurality of loudspeakers 131 disposed at different locations in the cockpit, and the sensor module 140 is configured to detect ride data and acoustic characteristics data in the cockpit. The ride data may include, but is not limited to, the number of passengers in the cockpit and the riding position of each passenger. The acoustic characteristic data may include, but is not limited to, a background noise characteristic, a reverberation characteristic, a direct sound characteristic, and a reflected sound characteristic. The bus 110 of the vehicle is configured to share the public data of the vehicle, which may include but is not limited to, the data related to the speed of the vehicle, the gear, the seat, the window, the sunroof, and the state of the door of the vehicle.

Specifically, a computer program is stored within the domain controller 120, which is essentially the in-vehicle adaptive sound playback method of the present application, i.e., the domain controller 120 implements the in-vehicle adaptive sound playback method of the present application by executing the computer program stored within itself. In the actual sound playback process, the domain controller 120 may acquire, in real-time, environmental data (including acoustic characteristic data, ride data, and public data of the vehicle shared by the bus 110) indicative of the environment of the cockpit, and analyze the sound playback parameters (including the sound effect parameters and the physical state parameters of the respective loudspeakers 131) of the sound system 100 compatible with the environmental data, and then acquire audio signal to be acoustically played back, process the audio signal based on the sound effect parameters to obtain the target audio signal, and regulate the physical state of each loudspeaker 131 based on the physical state parameters of each loudspeaker 131, and finally transmit the processed target audio signal to each loudspeaker 131 that has undergone physical state regulation, and perform sound playback of the target audio signal in the cockpit by these loudspeakers 131. It is to be noted that in the present application, the sound parameters are, such as, an audio software architecture, a mixing matrix, a signal flow, an equalizer, a delayer, a gain adjustment, a phase calibration, a reverberation adjustment, and a dynamic control. The physical state parameters may include but are not limited to, a power-on parameter for directing the loudspeakers 131 to enter a power-on state, a position parameter for adjusting the position of the loudspeaker 131 in the cockpit, and a radiation angle parameter for adjusting the radiation angle of the loudspeaker 131. Accordingly, the physical state of the loudspeaker 131 has, for example, a power-on state, a power-off state, a position in the cockpit, and a radiation angle.

It can be seen that since the sound playback parameters used in the sound playback process are compatible with the environmental parameters of the cockpit, the sound playback carried out in the cockpit is also compatible with the environment of the cockpit, then when the environment of the cockpit changes, the sound playback parameters used in the sound playback process will change accordingly, i.e., the sound playback in the present application has strong adaptability to different cockpit environments, and the optimal sound playback effect can be obtained in different cockpit environments, thereby bringing a preferred acoustic experience for the user. Besides, when the environment of the cockpit changes, the change of the sound playback parameters is spontaneous, so there is no need for the user to take the initiative in adjusting the sound playback parameters, which ensures the degree of intelligentization of the entire vehicle, and also reduces the user's tediousness in the operation.

Figure 2:
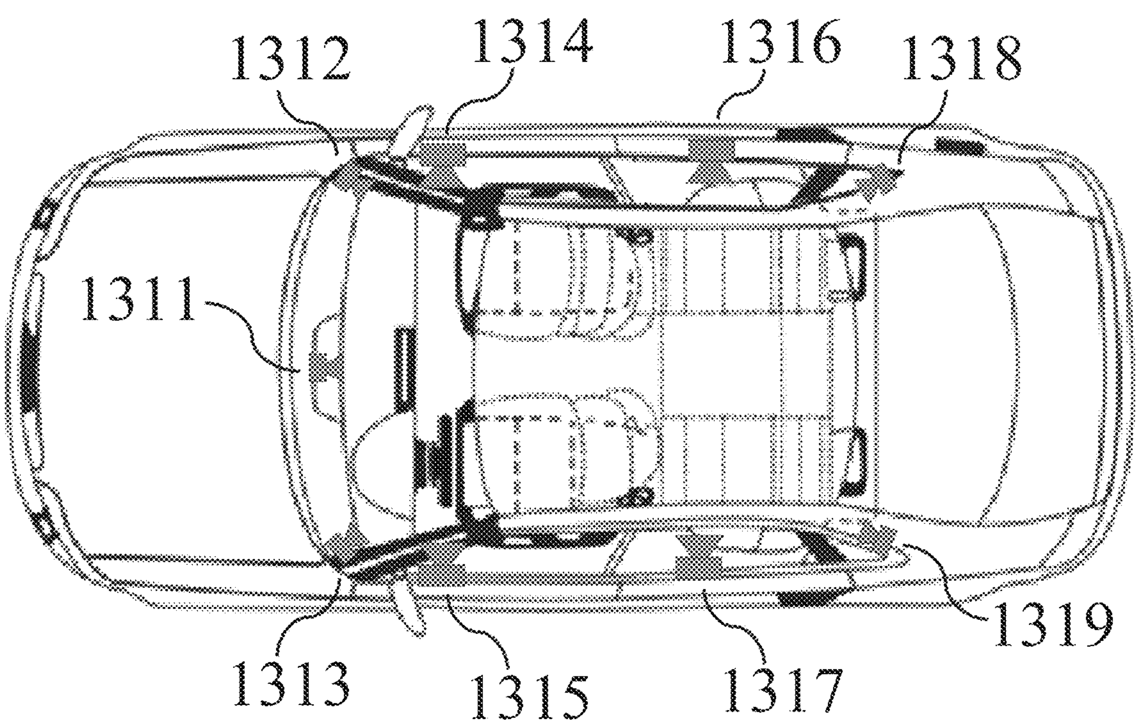
FIG. 2 shows a schematic diagram of a layout of a plurality of loudspeakers in a cockpit provided by embodiments of the present application.

As one of the embodiments, FIG. 2 is a schematic diagram of a layout of a plurality of loudspeakers of the loudspeaker module in a cockpit. The loudspeaker module 130 includes nine loudspeakers 131, which are a first loudspeaker 1311, a second loudspeaker 1312, a third loudspeaker 1313, a fourth loudspeaker 1314, a fifth loudspeaker 1315, a sixth loudspeaker 1316, a seventh loudspeaker 1317, an eighth loudspeaker 1318 and a ninth loudspeaker 1319. The cockpit of the vehicle is usually equipped with a center console close to the front of the vehicle and a shelf close to the rear of the vehicle. The first loudspeaker 1311 is provided in the middle of the center console. The second loudspeaker 1312 and the third loudspeaker 1313 are located on opposite sides of the center console, respectively. The fourth loudspeaker 1314 is provided on the right front door, the fifth loudspeaker 1315 is provided on the left front door, the sixth loudspeaker 1316 is provided on the right rear door, the seventh loudspeaker 1317 is provided on the left rear door, and the eighth loudspeaker 1318 and the ninth loudspeaker 1319 are disposed on opposite sides of the shelf, respectively. It can be understood that the number and the layout of loudspeakers 131 of the loudspeaker module 130 in the cockpit are determined according to the practical needs, which are not uniquely limited in the present application.

Figure 3:
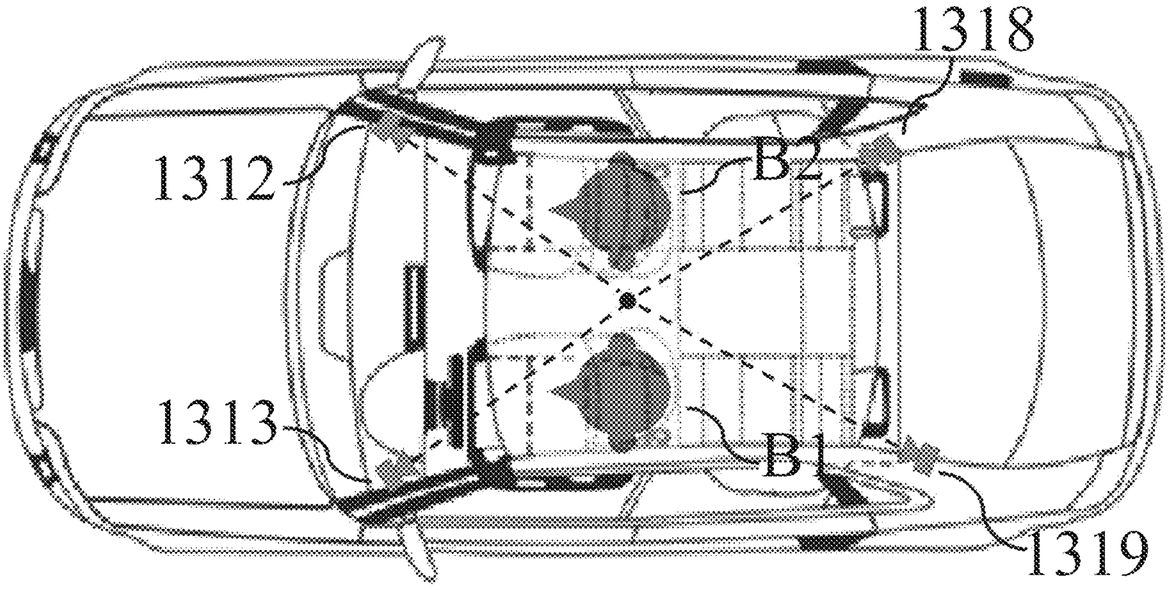
FIG. 3 shows a physical state diagram of the plurality of loudspeakers in the cockpit provided by embodiments of the present application.
Figure 4:
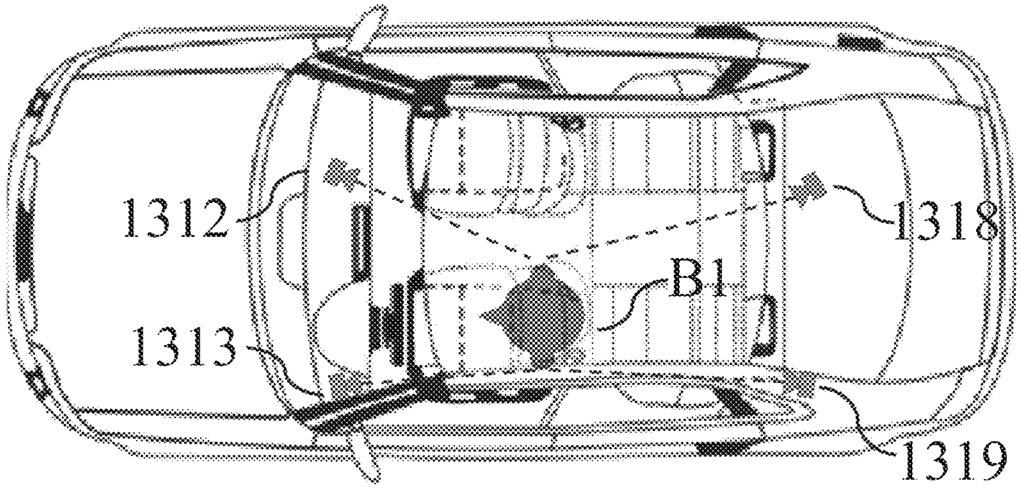
FIG. 4 shows another physical state diagram of the plurality of loudspeakers in the cockpit provided by embodiments of the present application.

In this embodiment, the nine loudspeakers 131 are all communicatively connected to the domain controller 120, that is to say, their physical states can all be regulated by the domain controller 120. In different environments of the cockpit, their physical states will also be different. For example, FIG. 3 shows a physical state diagram of the plurality of loudspeakers in the cockpit. When the environment of the cockpit is such that the main driver B1 is riding in the main driver's seat and the co-driver B2 is riding in the co-driver's seat, the domain controller 120 controls the second loudspeaker 1312, the third loudspeaker 1313, the eighth loudspeaker 1318, and the ninth loudspeaker 1319 to enter the power-on state, and control the second loudspeaker 1312 and the third loudspeaker 1313 to be located on opposite sides of the center console, and control the eighth loudspeaker 1318 and the ninth loudspeaker 1319 to be located on opposite sides of the storage console, and also control the radiation angles of the second loudspeaker 1312, the third loudspeaker 1313, the eighth loudspeaker 1318, and the ninth loudspeaker 1319 to point toward a center position between the main driver B1 and the co-pilot B2 (the process of radiation of the loudspeakers 131 is essentially an sound playback process), so as to achieve the purpose of evenly radiating the main driver B1 and the co-pilot B2. FIG. 4 shows another physical state diagram of the plurality of loudspeakers in the cockpit. When the environment of the cockpit is such that only the main driver B1 rides in the main driver's seat, the domain controller 120 controls the second loudspeaker 1312, the third loudspeaker 1313, the eighth loudspeaker 1318, and the ninth loudspeaker 1319 to enter the power-on state, and controls the second loudspeaker 1312 and the third loudspeaker 1313 to be located on the center console and symmetrical with respect to the main driver B1, and controls the eighth loudspeaker 1318 and the ninth loudspeaker 1319 to be located on the storage console and symmetrical with respect to the main driver B1. It is also necessary to control the radiation angles of the second loudspeaker 1312 and the eighth loudspeaker 1318 to both point to the right ear of the main driver B1, and the radiation angles of the third loudspeaker 1313 and the ninth loudspeaker 1319 to both point to the left ear of the main driver B1, in order to achieve symmetrical radiation of the main driver B1.

Figure 5:
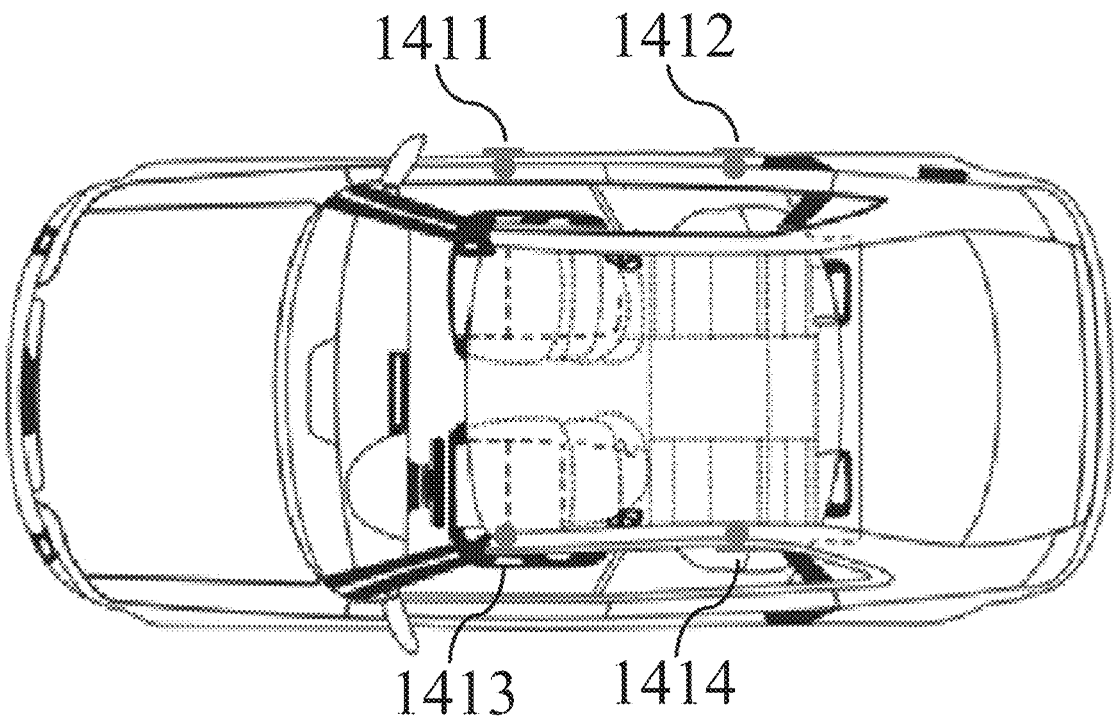
FIG. 5 shows a schematic diagram of a layout of a plurality of acoustic sensors in the cockpit provided by embodiments of the present application.

As one of the embodiments, the sensor module 140 includes a plurality of sensors, and the plurality of sensors are located at different positions in the cockpit, through which the ride data of the cockpit and the acoustic characteristic data in the cockpit can be detected in real-time. In some implementations of the present embodiment, the several sensors included in the sensor module 140 are acoustic sensors such as microphones, and the basic function of the acoustic sensors is a radio function, so the acoustic sensors can detect the acoustic characteristics of the data inside the cockpit. Furthermore, each acoustic sensor can be configured with a transmitter and a receiver such as an ultrasonic wave, so that through the transmitter and receiver of the ultrasonic wave and so forth, the data inside the cockpit can be easily detected. In addition, each acoustic sensor can be equipped with a transmitter and a receiver such as an ultrasonic wave, and by transmitting and receiving the ultrasonic wave, it can be easily detected which seats in the cockpit are occupied by passengers, and thus the number of passengers in the cockpit and the position of each passenger can be known, i.e., the ride data of the cockpit can be known. As one of the realization modes, FIG. 5 is a schematic diagram of a layout of the plurality of acoustic sensors in the cockpit. The sensor module 140 includes four acoustic sensors, which are a first acoustic sensor 1411, a second acoustic sensor 1412, a third acoustic sensor 1413, and a fourth acoustic sensor 1414. The first acoustic sensor 1411 is provided on a side of the passenger seat close to the right front door. The second acoustic sensor is provided on a side of the passenger seat close to the right front door. The third acoustic sensor 1413 is provided on a side of the main driver seat close to the left front door, and the fourth acoustic sensor 1414 is provided on a side of the rear left seat close to the left rear door. The four acoustic sensors can all detect the ride data of the cockpit and the acoustic characteristic data in the cockpit in real time, and detect the acoustic characteristic data and ride data to the domain controller 120.

In other implementations of the present embodiment, the sensor module 140 includes not only acoustic sensors, but also at least one of optical sensors such as optical lenses, mechanical sensors such as pressure sensors and acceleration sensors, and temperature sensors. The acoustic sensors are configured to detect in real time the acoustic characteristic data in the cockpit, and the optical sensors, mechanical sensors, and temperature sensors are all configured to detect the ride data of the cockpit in real-time. It can be understood that when the optical sensor is utilized to detect the ride data of the cockpit, the optical sensor transmits and receives light beams by means of a technique such as Time of Flight (TOF), so that it can easily detect which seats in the cockpit are occupied by passengers, and thus obtain the number of passengers in the cockpit and the location of the passengers, i.e., obtain the ride data of the cockpit. When the mechanical sensor is utilized to detect the ride data of the cockpit, the mechanical sensor may be provided on the seat in the cockpit. When there is no passenger riding in the seat, the pressure detected by the mechanical sensor is less than or equal to a preset pressure threshold, and when there is a passenger riding in the seat, the pressure detected by the mechanical sensor is greater than the preset pressure threshold. That is to say, once the pressure detected by the mechanical sensor is greater than the preset pressure threshold, it can be determined that the seat is occupied by a passenger, so that it can be easily detected which seats in the cockpit are occupied by a passenger, and thus obtain the number of passengers in the cockpit and the location of each passenger, i.e., obtain the ride data of the cockpit. When the temperature sensors are utilized to detect the ride data of the cockpit, the temperature sensors may be provided on the seats in the cockpit. When there is no passenger riding in the seat, the temperature detected by the temperature sensor is less than or equal to a preset temperature threshold, and when there is a passenger riding in the seat, the temperature detected by the temperature sensor is greater than the preset temperature threshold. That is to say, once the temperature detected by the temperature sensor is greater than the preset temperature threshold, it can be determined that there is a passenger riding in the seat, so that it can be easily detected which seats are riding with a passenger in the cockpit, and thus obtain the number of passengers and the position of each passenger, i.e., obtain the ride data of the cockpit.

Figure 6:
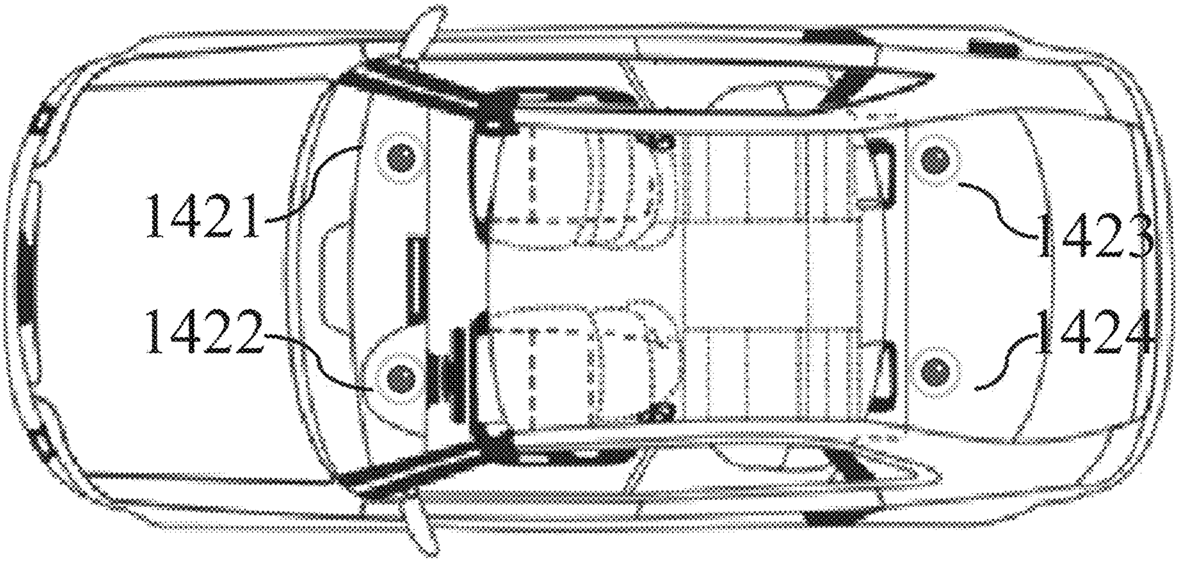
FIG. 6 shows a schematic diagram of a layout of a plurality of optical sensors in the cockpit provided by embodiments of the present application.
Figure 7:
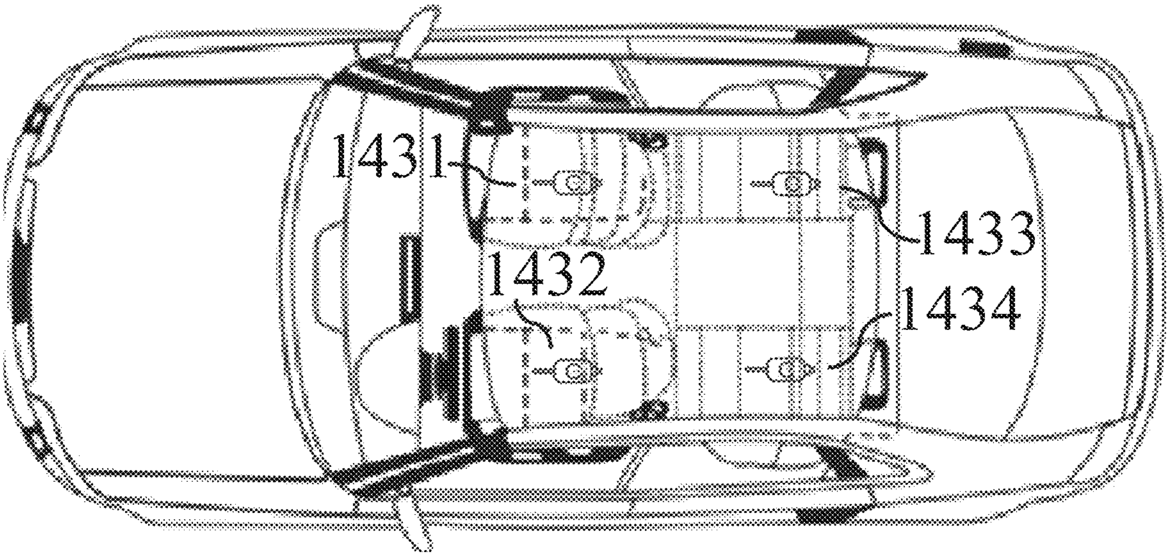
FIG. 7 shows a schematic diagram of a layout of a plurality of mechanical sensors in the cockpit provided by embodiments of the present application.
Figure 8:
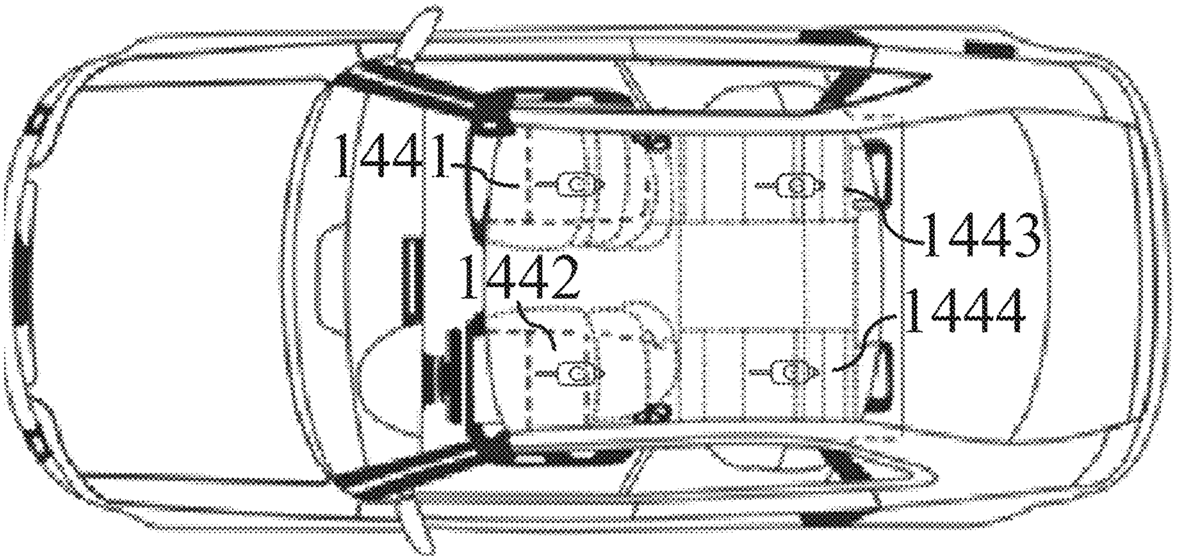
FIG. 8 shows a schematic diagram of a layout of a plurality of temperature sensors in the cockpit provided by embodiments of the present application.

As one of the realization modes, FIG. 6 is a schematic diagram of a layout of a plurality of optical sensors in the cockpit. When the optical sensors are utilized to detect the ride data of the cockpit, the sensor module 140 includes four optical sensors, which are a first optical sensor 1421, a second optical sensor 1422, a third optical sensor 1423, and a fourth optical sensor 1424. The four optical sensors are all provided on a carport. The first optical sensor 1421 and the second optical sensor 1422 are located close to the front of the vehicle and spaced apart from each other, and the third optical sensor 1423, and the fourth optical sensor 1424 are located close to the rear of the vehicle and spaced apart from each other. The four optical sensors all can detect the ride data of the cockpit in real-time and transmit the detected ride data to the domain controller 120. As another of the realization modes, FIG. 7 is a schematic diagram of a layout of a plurality of mechanical sensors in the cockpit. When the mechanical sensors are utilized to detect the ride data of the cockpit, the sensor module 140 includes four mechanical sensors, which are a first mechanical sensor 1431, a second mechanical sensor 1432, a third mechanical sensor 1433, and a fourth mechanical sensor 1434. The first mechanical sensor 1431 is provided on the assistant seat, the second mechanical sensor 1432 is provided on the main driver seat, the third mechanical sensor 1433 is provided on the rear right seat, and the fourth mechanical sensor 1434 is provided on the rear left seat. The four mechanical sensors all can detect the ride data of the cockpit in real-time and transmits the detected ride data to the domain controller 120. As another realization mode, FIG. 8 is a schematic diagram of a layout of a plurality of temperature sensors in the cockpit. When the temperature sensors are utilized to detect the ride data of the cockpit, the sensor module 140 includes four temperature sensors, which are a first temperature sensor 1441, a second temperature sensor 1442, a third temperature sensor 1443, and a fourth temperature sensor 1444. The first temperature sensor 1441 is provided on the assistant seat, the second temperature sensor 1442 is provided on the main driver seat, the third temperature sensor 1443 is provided on the rear right seat, and the fourth temperature sensor 1444 is provided on the rear left seat. The four temperature sensors can detect the ride data of the cockpit in real-time and transmit the detected ride data to the domain controller 120.

Figure 9:
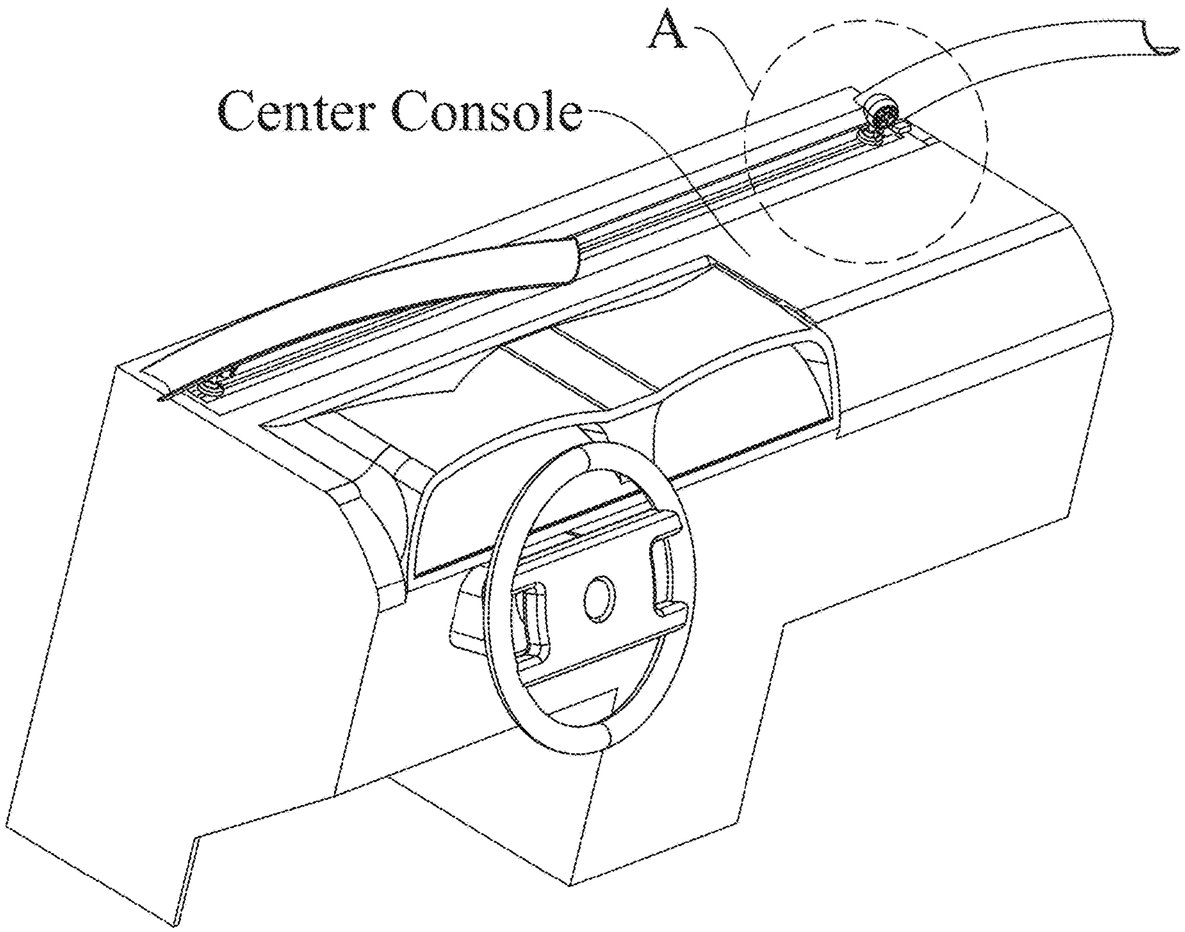
FIG. 9 shows a schematic assembly diagram of the loudspeakers in the cockpit provided by embodiments of the present application.
Figure 10:
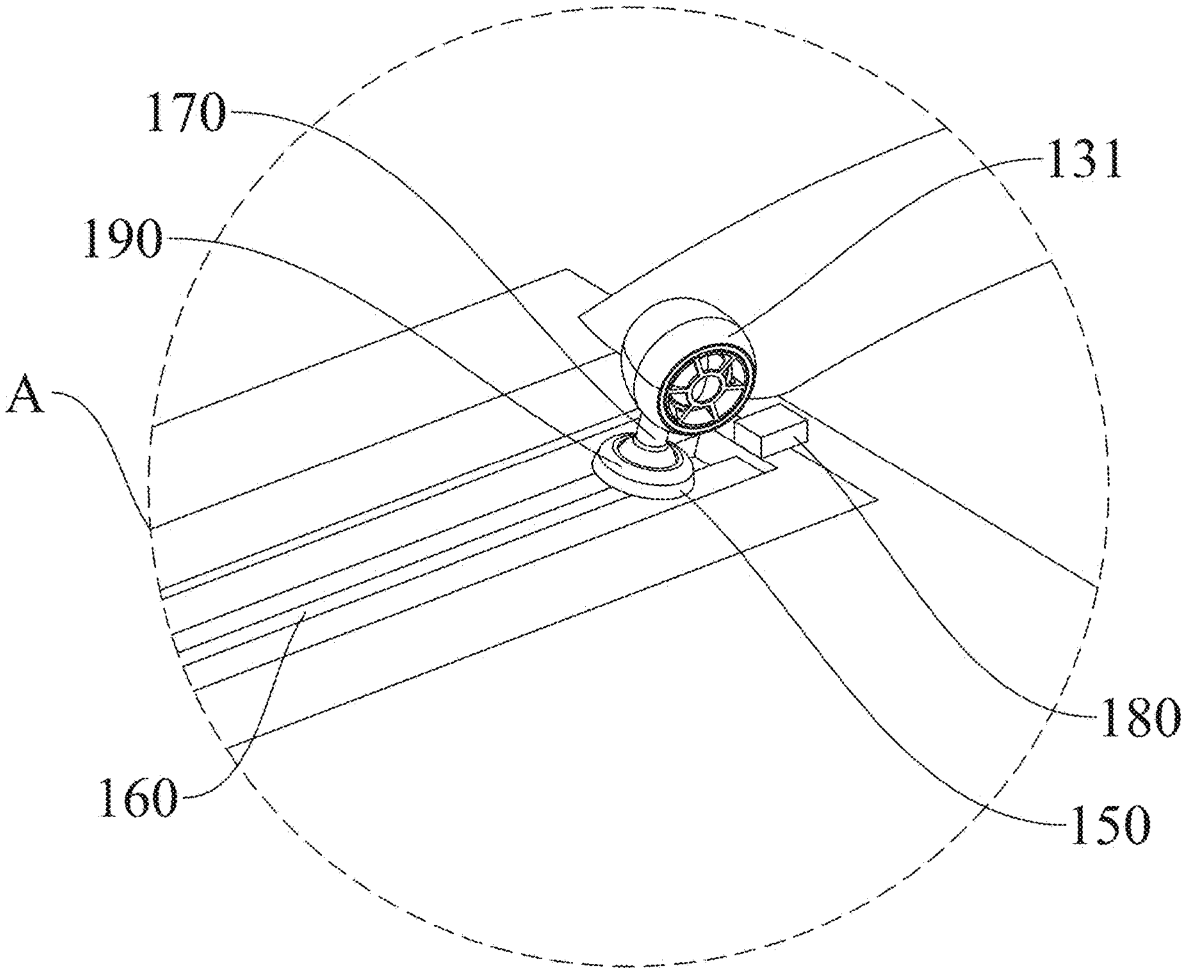
FIG. 10 is a partially enlarged view at A in FIG. 9 provided by embodiments of the present application.

As one of the embodiments, FIG. 9 is a schematic assembly diagram of the loudspeakers in the cockpit, and FIG. 10 is a partially enlarged view at A in FIG. 9. Each loudspeaker 131 in the loudspeaker module 130 is slidably cooperated with the wall of the cockpit by a sliding member 150 (e.g., a sliding groove 160 is opened in the wall of the cockpit and the sliding member 150 provided in the sliding groove 160). In addition to including the structure listed previously, the sound system 100 further includes a plurality of sliding drivers 180 communicatively connected to the domain controller 120, and each of the sliding drivers 180 is drivingly connected to a loudspeaker 131. Based on this, in regulating the physical state of each of the loudspeakers 131, the domain controller 120, may, based on the corresponding physical state parameter, send to each of the loudspeakers 131 a power-on instruction for directing it to enter the power-on state, or a power-off instruction for directing it to enter the power-off state, and a sliding instruction to each of the sliding drivers 180 of each of the loudspeakers 131 that received the power-on instruction. Subsequently, each of the sliding drivers 180 that received the sliding instruction may drive the corresponding loudspeaker 131 to slide on the wall of the cockpit according to the corresponding sliding instruction, thereby adjusting the position of the respective loudspeaker 131 receiving the power-on instruction in the cockpit.

Further, each loudspeaker 131 in the loudspeaker module 130 is rotatably coupled with a corresponding sliding member 150 (e.g., each loudspeaker 131 is connected to a respective sliding member 150 through a rotating shaft 170), and the sound system 100 further includes a plurality of rotary drivers 190 communicatively connected to the domain controller 120. Each rotary driver 190 is drivingly connected to a loudspeaker 131. Based on this, when regulating the physical state of each loudspeaker 131, the domain controller 120 may also send a rotational instruction to the rotary driver 190 of each loudspeaker 131 in the power-on state according to the corresponding physical state parameter, and then each of the rotary drivers 190 receiving the rotational instruction may drive the corresponding loudspeaker 131 to rotate according to the respective rotational instruction, thereby adjusting the rotation of each loudspeaker 131 in the power-on state, thereby adjusting the radiation angle of the respective loudspeaker 131 in the power-on state.

As one of the embodiments, when the domain controller 120 analyzes the sound playback parameters compatible with the environment of the cockpit, regulates the physical state of each loudspeaker 131 in the loudspeaker module 130 according to the sound playback parameters, and processes the audio signal to be played back according to the sound playback parameters to obtain the target audio signal, so that the target audio signal can be carried out in the cockpit by the loudspeaker 131 in the power-on state in the loudspeaker module 130, and the target audio signal can be carried out by the loudspeaker 131 in the power-on state, and the sound playback effect in the cockpit at this time is compatible with the environment of the cockpit and is optimal. However, the passengers in the cockpit cannot remain motionless for a long period of time and inevitably move their bodies to make their ride comfortable in the process of riding. At this time, the number of passengers in the cockpit as well as the location of the passengers have not changed, i.e., the environment of the cockpit has not changed. The sound playback parameters utilized in the sound playback process will not change, i.e., the sound playback effect in the cockpit will remain unchanged. But after all, the passengers have moved their bodies in the original riding position, which will lead to a change in the relative positions of the passengers and the loudspeakers in the cockpit, and at this time, the listening effect of the passengers will inevitably be biased compared to the optimal listening effect before the body movement, i.e., the sound playback effect will be biased compared to the optimal listening effect before the body movement, i.e., the sound playback effect will be biased compared to the optimal listening effect before the body movement in the cockpit. In this case, the present embodiment can adjust the sound playback parameters utilized in the sound replay process in real time under the premise that the cockpit environment has not been changed, so as to ensure that under the premise that the cockpit environment has not been changed, even if the passengers have moved their bodies in their original riding positions, they can still obtain the optimal listening effect, i.e., the sound replay effect in the cockpit can be maintained at the optimal level all the time.

Figure 11:
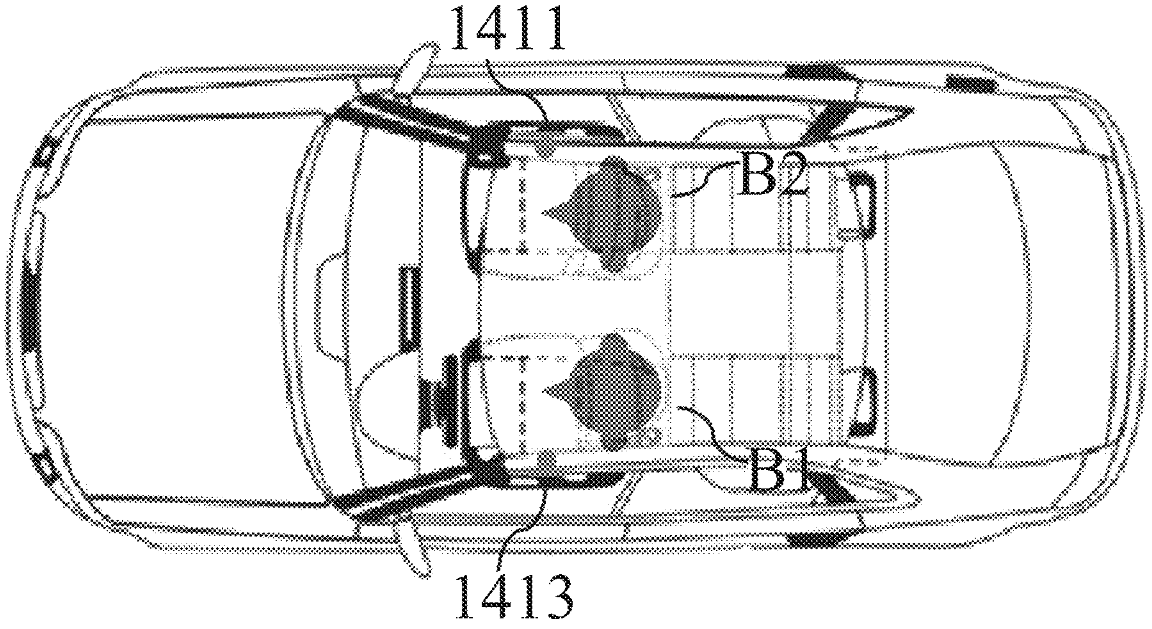
FIG. 11 is a diagram showing an example of acoustic response data detection provided by embodiments of the present application.
Figure 12:
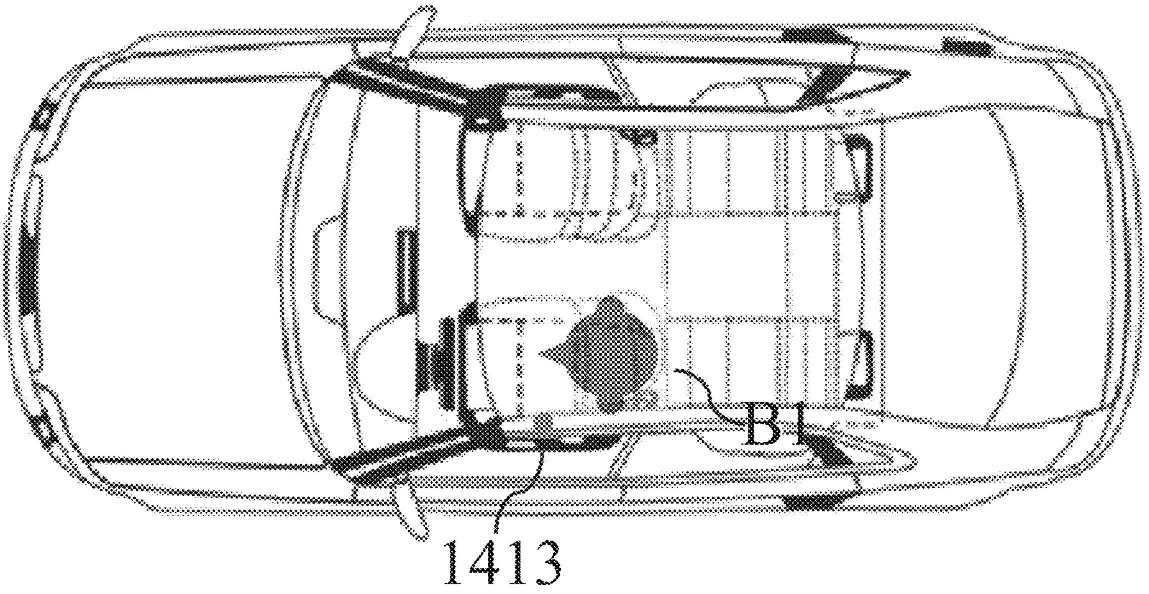
FIG. 12 is a diagram showing another example of acoustic response data detection provided by embodiments of the present application.

Specifically, the sensor module 140 of the present embodiment can detect in real-time the ride data and the internal acoustic characteristics data of the cockpit, but can also detect in real-time the acoustic response data of the passengers in the cockpit. Since the acoustic response data of the passenger's ear is most capable of characterizing the listening effect of the passenger, it is preferable for the sensor module 140 of the present embodiment to detect in real time the acoustic response data of the ear of the passenger in the cockpit. For example, FIG. 11 is a diagram showing an example of acoustic response data detection. When the environment of the cockpit is such that the main driver B1 is riding in the main driver seat, and the passenger B2 is riding in the assistant seat, the acoustic response data at the ear of the passenger B2 can be detected in real-time by the first acoustic sensor 1411, and the acoustic response data at the ear of the main driver B1 can be detected in real-time by the third acoustic sensor 1413. FIG. 12 is a diagram showing another example of acoustic response data detection. When the environment of the cockpit is such that only the main driver B1 is riding in the main driver seat, the acoustic response data at the ear of the main driver B1 may be detected in real-time by the third acoustic sensor 1413

Based on this, in the practical sound playback process, the domain controller 120 regulates the physical state of each loudspeaker 131 in the loudspeaker module 130 according to the sound playback parameters that are compatible with the environment of the cockpit, and processes the audio signal to be acoustically played back to obtain the target audio signal according to the sound playback parameters. After performing acoustic playback of the target audio signal in the cockpit through the loudspeakers 131 in the speaker module 130 that are in the power-on state, the domain controller 120 may also acquire acoustic response data at the ear of each passenger in the cockpit in real-time, and compare the acoustic response data at the ear of each passenger with the preset desired acoustic response data, so that the sound playback parameters may be dynamically adjusted according to the difference between the two, and the acoustic response data at each passenger's ear is in line with the desired acoustic response data. Therefore, under the premise that the cabin environment has not changed, even if the passenger is in the original position of the passenger body movement, the optimal listening effect can also be obtained.

Figure 13:
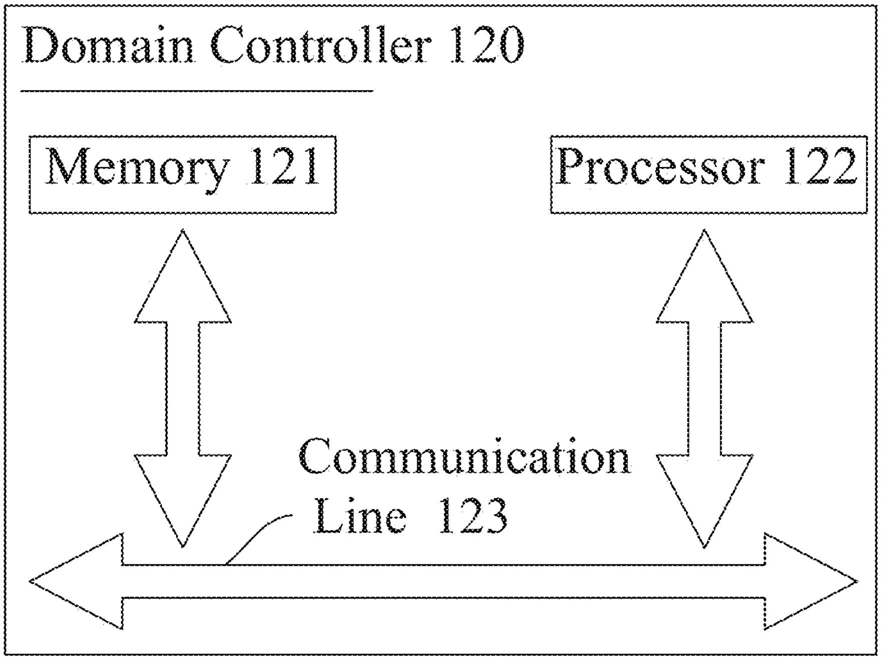
FIG. 13 is a block diagram of a domain controller provided by embodiments of the present application.

As one of the embodiments, FIG. 13 is a block diagram of the domain controller. The domain controller 120 includes a memory 121 and a processor 122. The memory 121 is communicatively connected to the processor 122, and there is a computer program stored in the memory 121, which is the in-vehicle adaptive sound playback method of the present application. That is to say, the processor 122 can call the computer program stored in the memory 121 to realize the in-vehicle adaptive sound playback method. In addition, it should be noted that the domain controller 120, in addition to including the memory 121 and the processor 122, may also include other structures common in the art, such as a communication line 123 for realizing a communication connection between the memory 121 and the processor 122, which is not listed herein in the present application.

In some embodiments of the present embodiment, the processor 122 includes an integrated circuit, which may include a single packaged integrated circuit, or may include a plurality of packaged integrated circuits with the same function or different functions. The processor 122 may include any one or a combination of a central processing unit (CPU), a microprocessor, a neural network chip, a digital processing chip, a graphics processor, and various control chips. It can be understood that the processor 122 belongs to the control core of the domain controller 120, and the processor 122 utilizes various interfaces and lines to connect various components of the entire domain controller 120, and realizes various functions and data processing of the domain controller 120, such as realizing the adaptive sound playback function of the present application, by running or executing a computer program or a module, and by calling up data.

In some embodiments of this embodiment, the memory 121 includes at least one type of computer-readable storage medium, and the computer-readable storage medium may include, but is not limited to, a flash memory, a removable hard disk, a multimedia card, a card-type memory (e.g., an SD memory, a DX memory), a magnetic memory, a disk, and an optical disk. In these embodiments, the memory 121 may be an internal storage unit of the domain controller 120 (e.g., a removable hard disk of the domain controller 120), an external storage device of the domain controller 120, such as a plug-in removable hard disk, a smart memory card (SMC), a secure digital (SD) card, and a flash memory card that is equipped on the domain controller 120. Or the memory 121 may be both the domain controller 120's internal storage unit and external storage device. Further, the memory 121 may be used not only for storing application software, various types of data, and computer programs (such as code for realizing the adaptive sound playback function of the present application) arranged in the domain controller 120, but may also be used for temporarily storing data that has been output or will be output. In the practical working process of the domain controller 120, the processor 122 may call up and run the computer program stored in the memory 121, thereby realizing the adaptive sound playback function of the present application.

Figure 14:
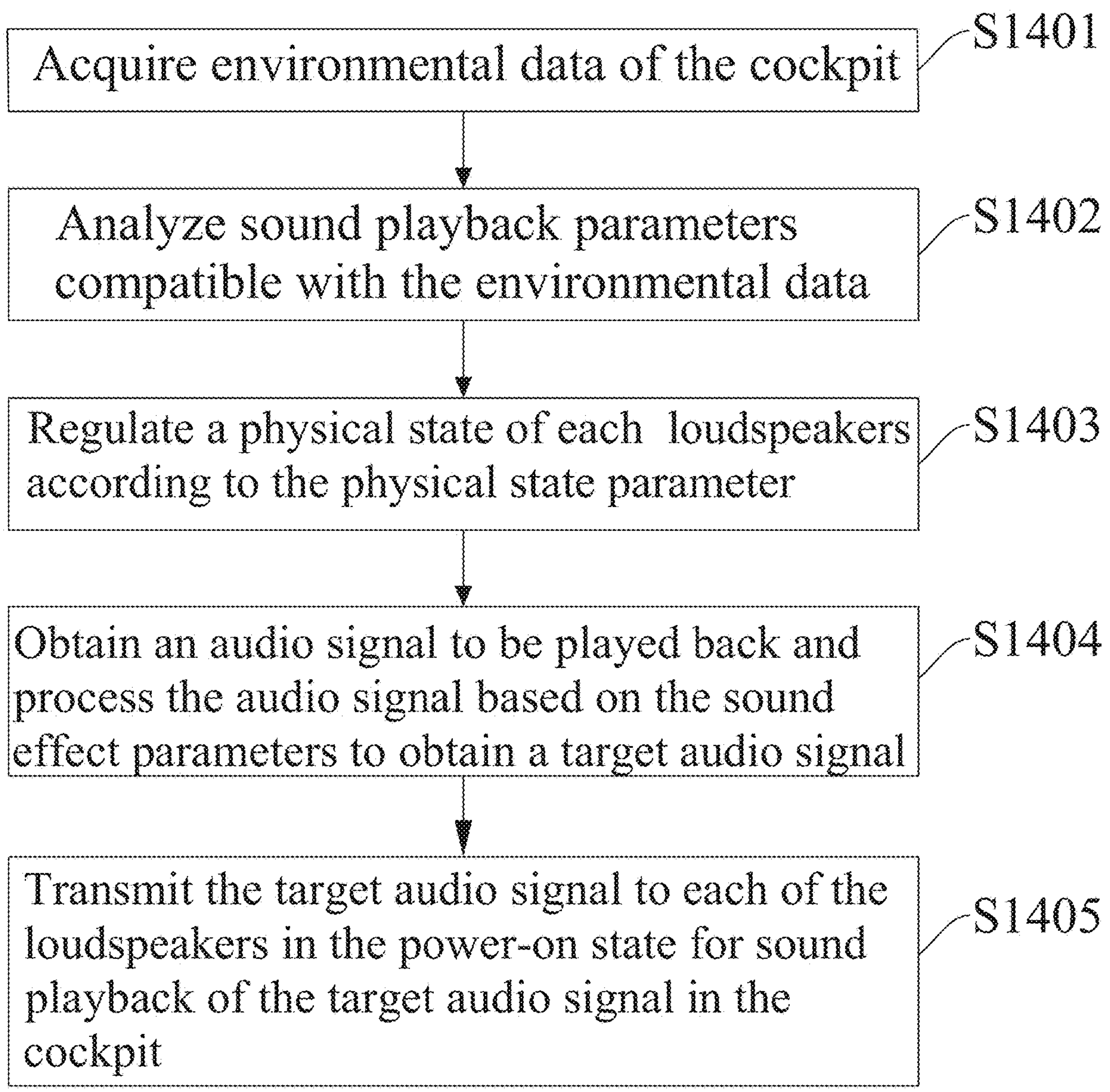
FIG. 14 shows a flowchart of an in-vehicle adaptive sound playback method provided by embodiments of the present application.

The above embodiments are only preferred realization modes of the present application, and are not a sole limitation on the sound system 100, the domain controller 120, and other related contents. In this regard, the technical personnel in the field may, on the basis of the above embodiments, flexibly set up according to the practical application scenarios. In the following, the computer program executed by the processor 122 in the domain controller 120 (i.e., the in-vehicle adaptive sound playback method proposed in the present application) will be elaborated in detail. FIG. 14 is a flowchart of the in-vehicle adaptive sound playback method. In some embodiments, the in-vehicle adaptive sound playback method includes steps 1401 to steps 1405 (abbreviated as S1401 to S1405), which is mainly used for spontaneously performing sound playback in the cockpit of a vehicle compatible with the environment of the cockpit, so as to circumvent the disadvantage of the conventional solution that the sound playback is poorly compatible with the environment of different cockpits. In the following steps, the present application will describe the processor 122 in the domain controller 120 as the execution subject.

S1401, the environmental data of the cockpit is obtained.

In some embodiments, the sensor module 140 can detect the ride data of the cockpit and the acoustic characteristics data in the cockpit in real-time, and the bus 110 of the vehicle can share the public data of the vehicle in real-time, The sensor module 140 and the bus 110 of the vehicle are both communicatively connected to the domain controller 120, so the domain controller 120 can acquire the ride data, the acoustic characteristics data, and the public data of the vehicle in real-time. The data acquired by the domain controller 120 can indicate the environment of the cockpit, so these data are collectively referred to as the environmental data of the cockpit.

S1402, sound playback parameters compatible with the environmental data are analyzed.

In some embodiments, after the domain controller 120 obtains the environmental data of the cockpit, it needs to analyze the sound playback parameters of the sound system 100 that are compatible with the environmental data, i.e., analyze the sound effect parameters and the physical state parameters of each loudspeaker 131 in the loudspeaker module 130 that are compatible with the environment of the cockpit. As one embodiment thereof, the process of analyzing the sound playback parameters compatible with the environmental data by the domain controller 120 includes: obtaining a predetermined lookup table; where the lookup table indicates a corresponding relationship between the environmental data and the sound playback parameters of the sound system 100; and searching for the sound playback parameters in the lookup table that correspond to the environmental data using the environmental data as a basis. As another embodiment thereof, the process of the domain controller 120 analyzing the sound playback parameters compatible with the environmental data includes: obtaining a predetermined mapping function; wherein the mapping function indicates a corresponding relationship between the environmental data and the sound playback parameters of the sound system 100; and inputting the environmental data into the mapping function and obtaining the sound playback parameters corresponding to the environmental data output from the mapping function.

S1403, the physical state of each loudspeaker is regulated according to the physical state parameter.

In some embodiments, after the domain controller 120 analyzes the sound playback parameters and the physical state parameters of each loudspeaker 131 in the loudspeaker module 130 that are compatible with the environment of the cockpit, the physical state of each loudspeaker 131 can be regulated according to the physical state parameters of each loudspeaker 131, for example, regulating the power on or off of each loudspeaker 131, the position and the radiation angle inside the cockpit, so as to make the physical state of each loudspeaker 131 compatible with the environment of the cockpit. physical state of the loudspeaker 131 be compatible with the environment of the cockpit, As one of the embodiments, the process of the domain controller 120 regulating the physical state of each loudspeaker 131 according to the physical state parameter of each loudspeaker 131 includes: transmitting a power-on instruction or a power-off instruction to each of the loudspeakers 131 according to the physical state parameter of each loudspeaker 131; where the power-on instruction is configured to direct the loudspeaker 131 to enter a power-on state, and the power-off instruction is configured to direct the loudspeaker 131 to enter a power-off state; transmitting a sliding instruction to the sliding driver 180 of each loudspeaker 131 receiving the sliding instruction to direct each sliding driver 180 receiving the sliding instruction to drive the corresponding loudspeaker 131 to slide on the wall of the cockpit according to the corresponding sliding instruction, so as to adjust the position of the respective loudspeaker 131 receiving the power-on instruction in the cockpit; and transmitting a rotational instruction to the rotary driver 190 of each loudspeaker 131 in the power-on state to direct each rotary driver 190 receiving the rotational rotary to all drive the corresponding loudspeaker 131 to rotate in accordance with the respective rotational instruction, thereby adjusting the radiation angle of each loudspeaker 131 in the power-on state.

S1404, an audio signal to be played back is obtained and the audio signal is processed to obtain a target audio signal based on sound effect parameters.

In some embodiments, after the domain controller 120 regulates the physical state of each loudspeaker 131 according to the physical state parameter of each loudspeaker 131, it also needs to acquire the audio signal to be played back and process the audio signal based on the sound effect parameter compatible with the environment of the cockpit to obtain the target audio signal. It is to be noted that between the domain controller 120 regulating the physical state of each loudspeaker 131 according to the physical state parameters of each loudspeaker 131 and processing the audio signal based on the sound effect parameters, i.e., between S1403 and S1404, there is no clear order of execution, and either of the two may be executed first, or both may be executed simultaneously, which is not uniquely limited by the present application.

S1405, the target audio signal is transmitted to each loudspeaker in the powered-on state for sound playback of the target audio signal in the cockpit.

In some embodiments, after the domain controller 120 processes the audio signals to obtain the target audio signals based on sound parameters that are compatible with the environment of the cockpit, it can transmit the target audio signals to the respective loudspeakers 131 in the powered-on state, with the purpose of carrying out sound playback of the target audio signals in the cockpit by these loudspeakers 131, and the sound playback carried out at this time is compatible with the environment of the cockpit. As one of the embodiments, the process of the domain controller 120 transmitting the target audio signals to the loudspeakers 131 in the power-on state includes: performing digital-to-analog conversion of the target audio signals; performing power amplification of the target audio signals after the digital-to-analog conversion; and transmitting the target audio signals after the power amplification to the loudspeakers 131 in the power-on state. It can be understood that the audio signal to be played back and the processed target audio signal are digital signals, i.e., the processing of the audio signal based on the sound effect parameters also belongs to digital signal processing, while the target audio signal obtained after digital-to-analog conversion of the target audio signal belongs to an analog signal, i.e., the domain controller 120 transmits the target audio signal in the form of an analog signal to the respective loudspeaker 131.

As one of the embodiments, as mentioned in the preceding section, under the premise that the environment of the cockpit has not been changed, if the passengers move their bodies in the original riding position, the listening effect of the passengers will also be affected, i.e., the listening effect of the passengers will be deviated from the optimal listening effect before the movement of the passengers, therefore, after S1405, the following steps are also included: obtaining acoustic response data at the ears of the passengers in the cockpit; comparing the acoustic response data at the ear of each passenger with the preset desired acoustic response data, and dynamically adjusting the acoustic playback parameters according to the difference between the acoustic response data and desired acoustic response data, so that the acoustic response data at the ear of each passenger conforms to the desired acoustic response data. As a result, under the premise of no change in the cockpit environment, even if the passenger has moved his or her body in the original riding position, the optimal listening effect can be obtained. In addition, it should be noted that the unexhausted points in the description of the in-vehicle adaptive sound playback method, it can refer to the previous description related to the audio system 100, and the description will not be illustrated here.

The above embodiments are only preferred realization modes of the present application, and are not the only limitation on the content of the adaptive sound playback method in the vehicle. In this regard, the technical personnel in the field may, on the basis of the above embodiment, flexibly set up according to the practical application scenarios. It is to be understood that through the implementation of the above embodiments of the present application, the domain controller 120 is utilized to obtain environmental data indicative of the environment of the cockpit, analyze the sound playback parameters (i.e., the sound effect parameters and the physical state parameters of each loudspeaker 131) that are compatible with the environmental data, and then regulate the physical state of each loudspeaker 131 according to the physical state parameters and process the audio signal to be played back according to the sound effect parameters to obtain the target audio signal, and finally, the target audio signal is processed according to the sound effect parameters, and the target audio signal is finally obtained. Then the physical state of each loudspeaker 131 is regulated according to the physical state parameter, and the audio signal to be played back is processed according to the sound effect parameter to obtain the target audio signal, finally, the target audio signal is transmitted to the loudspeakers 131 which have been regulated by the physical state, so as to carry out the sound playback of the target audio signal in the cockpit by these loudspeakers 131. From this, it can be known that since the sound playback parameters used in the sound playback process are compatible with the environmental parameters of the cockpit, the sound playback carried out inside the cockpit is also compatible with the environment of the cockpit. When the environment of the cockpit changes, the sound playback parameters used in the sound playback process will also change accordingly, i.e., the sound playback in the present application has strong adaptability to different cockpit environments, and the optimal sound playback effect is obtained in different cockpit environments, thereby bringing a preferred acoustic experience for the user. Moreover, when the environment of the cockpit changes, the change of the sound playback parameters is spontaneous, which does not require the user to manually/voice-adjust the sound playback parameters, which not only ensures the degree of intelligentization of the whole vehicle, but also reduces the user's tediousness in operation.

The steps of the method or algorithm described in conjunction with the embodiments disclosed herein may be implemented directly with hardware, a software module executed by a processor, or utilizing a combination of both, wherein the software module may be set in random memory (RAM), memory, read-only memory (ROM), electrically programmable ROM, electrically erasable programmable ROM, a register, a hard disk, a removable disk, a CD-ROM or any other form of storage medium known in the art.

In the embodiments described above, this may be implemented in whole or in part by software, hardware, firmware, or any combination thereof. When implemented using software, it may be implemented, in whole or in part, in the form of a computer program product comprising one or more computer instructions that, when loaded and executed on a computer, produce, in whole or in part, the processes or functions described in the present application, and the computer may be a general-purpose computer, a specialized computer, a computer network, or other programmable device. The computer instructions may be stored in a computer-readable storage medium or transmitted from one computer-readable storage medium to another computer-readable storage medium, e.g., the computer instructions may be transmitted by wired (e.g., coaxial cable, fiber optic, digital subscriber line) or wireless (e.g., infrared, wireless, microwave) means from one website site, computer, server, or data center to another website site, computer, server, or data center. A computer-readable storage medium may be any usable medium to which a computer has access or a data storage device such as a server, data center, etc. that is integrated with one or more usable media. Available media may be magnetic media (such as floppy disks, hard disks, and magnetic tapes), optical media (such as DVDs), or semiconductor media (such as solid-state drives).

It is to be noted that each of the above-described embodiments of the present application is described in a recursive manner, with each embodiment focusing on differences from the others, and it is sufficient to refer to each embodiment for the same/similar portions of each embodiment in relation to each other. It is also noted that in this application, relational terms such as first and second are used only to distinguish one entity or operation from another, and do not necessarily require or imply any actual relationship or order between these entities or operations. Further, the terms "including", "comprising", or any variation thereof, are intended to cover non-exclusive inclusion, such that a process, method, article, or equipment including a range of elements may include not only the elements listed but also other elements not expressly listed or which are inherent in such process, method, article or equipment. Without further limitation, the fact that an element is defined by the phrase "including . . . " does not exclude the existence of another identical element in the process, method, article, or apparatus including the said element.

The description of each of the above embodiments of the present application enables a person skilled in the art to realize or use the contents of the present application. Various modifications to these embodiments will be apparent to those skilled in the art, and the general principles defined in the contents of this application can be realized in other embodiments without departing from the spirit or scope of the contents of this application. Therefore, the present application contents will not be limited to these embodiments shown in contents of the present application, but will be subject to the widest scope consistent with the principles and novel features disclosed in the present application contents.

What is claimed is:

1. An in-vehicle adaptive sound playback method applied to a sound system of a vehicle, the sound system comprising a domain controller communicatively connected to a bus of the vehicle, and a loudspeaker module arranged in a cockpit of the vehicle and communicatively connected to the domain controller, the loudspeaker module comprising a plurality of loudspeakers located at different positions in the cockpit; wherein the sound system further comprises a sensor module provided in the cockpit and communicatively connected to the domain controller, the sensor module being configured to detecting ride data of the cockpit and acoustic characteristic data in the cockpit; the in-vehicle adaptive sound playback method is applied in the domain controller, and comprises:

acquiring environmental data of the cockpit; wherein the environmental data comprises the acoustic characterization data, the ride data, and public data of the vehicle shared by the bus;

analyzing sound playback parameters compatible with the environmental data; wherein the sound playback parameter comprises a sound effect parameter and a physical state parameter of each of the loudspeakers;

regulating a physical state of each of the loudspeakers according to the physical state parameter; wherein the physical state comprises a power-on state and a power-off state;

obtaining an audio signal to be played back and processing the audio signal based on the sound effect parameters to obtain a target audio signal; and transmitting the target audio signal to each of the loudspeakers in the power-on state for sound playback of the target audio signal in the cockpit.

2. The method of claim 1, wherein the step of analyzing the sound playback parameters compatible with the environmental data comprises:

obtaining a predetermined lookup table; wherein the lookup table indicates a corresponding relationship between the environmental data and the sound playback parameters of the sound system; and searching for the sound playback parameters in the lookup table that correspond to the environmental data using the environmental data as a basis.

3. The method of claim 1, wherein the step of analyzing the sound playback parameters compatible with the environmental data comprises:

obtaining a predetermined mapping function; wherein the mapping function indicates a corresponding relationship between the environmental data and the sound playback parameters of the sound system; and inputting the environmental data into the mapping function and obtaining the sound playback parameters corresponding to the environmental data output from the mapping function.

4. The method of claim 1, wherein each of the loudspeakers is slidably cooperated with a wall of the cockpit by a sliding member; the sound system further comprises a plurality of sliding drivers communicatively connected to the domain controller, each of the sliding drivers being drivingly connected to one of the loudspeakers; the physical state further comprising a position of each of the loudspeakers in the cockpit; the step of regulating the physical state of each of the loudspeakers according to the physical state parameter comprises:

transmitting a power-on instruction or a power-off instruction to each of the loudspeakers according to the physical state parameter; wherein the power-on instruction is configured to direct the loudspeaker to enter a power-on state, and the power-off instruction is configured to direct the loudspeaker to enter a power-off state; and transmitting a sliding instruction to the sliding driver of each of the loudspeakers in the power-on state according to the physical state parameter; wherein the sliding instruction is configured to direct the sliding driver to drive the corresponding loudspeaker to slide on the wall of the cockpit to adjust the position of the loudspeaker in the cockpit.

5. The method of claim 4, wherein each of the loudspeakers is rotatably cooperated with one of the sliding members correspondingly; the sound system further comprises a plurality of rotary drivers communicatively connected to the domain controller, each the rotary driver being drivingly connected to one of the loudspeakers; the physical state further comprises a radiation angle of each of the loudspeakers; the step of regulating the physical state of each of the loudspeakers according to the physical state parameter further comprises:

transmitting a rotation instruction to the rotary driver of each of the loudspeakers in the power-on state according to the physical state parameter; wherein the rotation instruction is configured to direct the rotary driver to drive the corresponding loudspeaker to rotate to adjust the radiation angle of the loudspeaker.

6. The method of claim 1, wherein the sensor module is further configured to detect acoustic response data at each passenger in the cockpit; after the steps of transmitting the target audio signal to each of the loudspeakers in the powered-on state after the step of transmitting the target audio signal to each of the loudspeakers in the powered-on state, the method further comprising:

obtaining the acoustic response data; and dynamically adjusting the sound playback parameters based on a difference between the acoustic response data and desired acoustic response data, to make the acoustic response data conform to the desired acoustic response data.

7. The method of claim 1, wherein the step of transmitting the target audio signal to each of the loudspeakers in the powered-on state comprises:

performing a digital-to-analog conversion of the target audio signal;

performing a power amplification on the target audio signal after digital-to-analog conversion; and transmitting the target audio signal after power amplification to each of the loudspeakers in the power-on state.

8. The method of claim 1, wherein the sensor module comprises a plurality of sensors respectively located at different positions in the cockpit; the plurality of the sensors are acoustic sensors, and the step of obtaining the environmental data of the cockpit comprises:

obtaining public data of the vehicle shared by the bus; and obtaining the ride data of the cockpit detected by the acoustic sensors, and the acoustic characterization data in the cockpit.

9. The method of claim 1, wherein the sensor module comprises a plurality of sensors respectively located at different positions within the cockpit; the sensors comprise an acoustic sensor, and at least one of an optical sensor, a mechanical sensor, and a temperature sensor; and the step of obtaining the environmental data of the cockpit comprises:

obtaining public data of the vehicle shared by the bus;

obtaining the acoustic characteristics data in the cockpit detected by the acoustic sensor; and obtaining the ride data for the cockpit detected by at least one of the optical sensor, the mechanical sensor, and the temperature sensor.

10. An acoustic system, wherein an in-vehicle adaptive sound playback method of claim 1 is applied to perform sound playback in the cockpit of the vehicle.

11. The domain controller, comprising:

a memory configured to store a computer program; and a processor communicatively connected to the memory and configured to invoke the computer program to implement the in-vehicle adaptive sound playback method of claim 1.

* * * * *